March 12, 1929.    F. J. IRVING    1,704,943
THERMOSTATICALLY CONTROLLED POWER ACTUATED MEANS
Original Filed Dec. 20, 1920    2 Sheets-Sheet 2
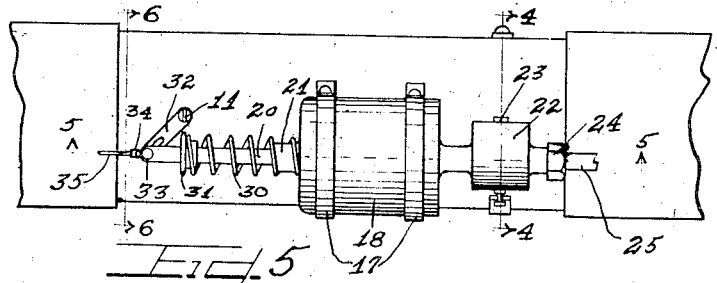
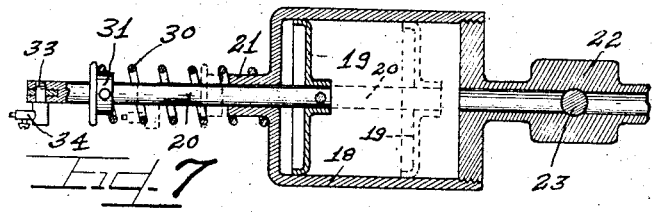
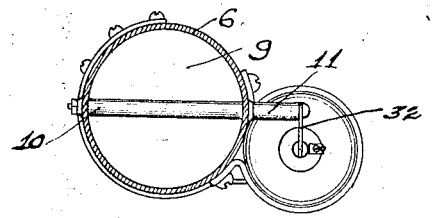
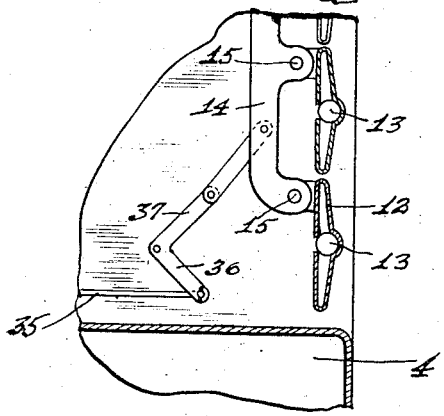
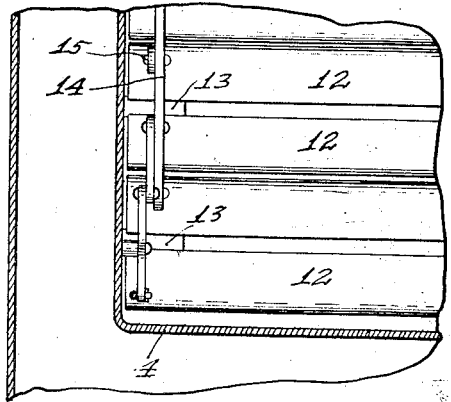
Witnesses
Rudolph J. Berg.
Inventor
Frank J. Irving.
By
Atty.

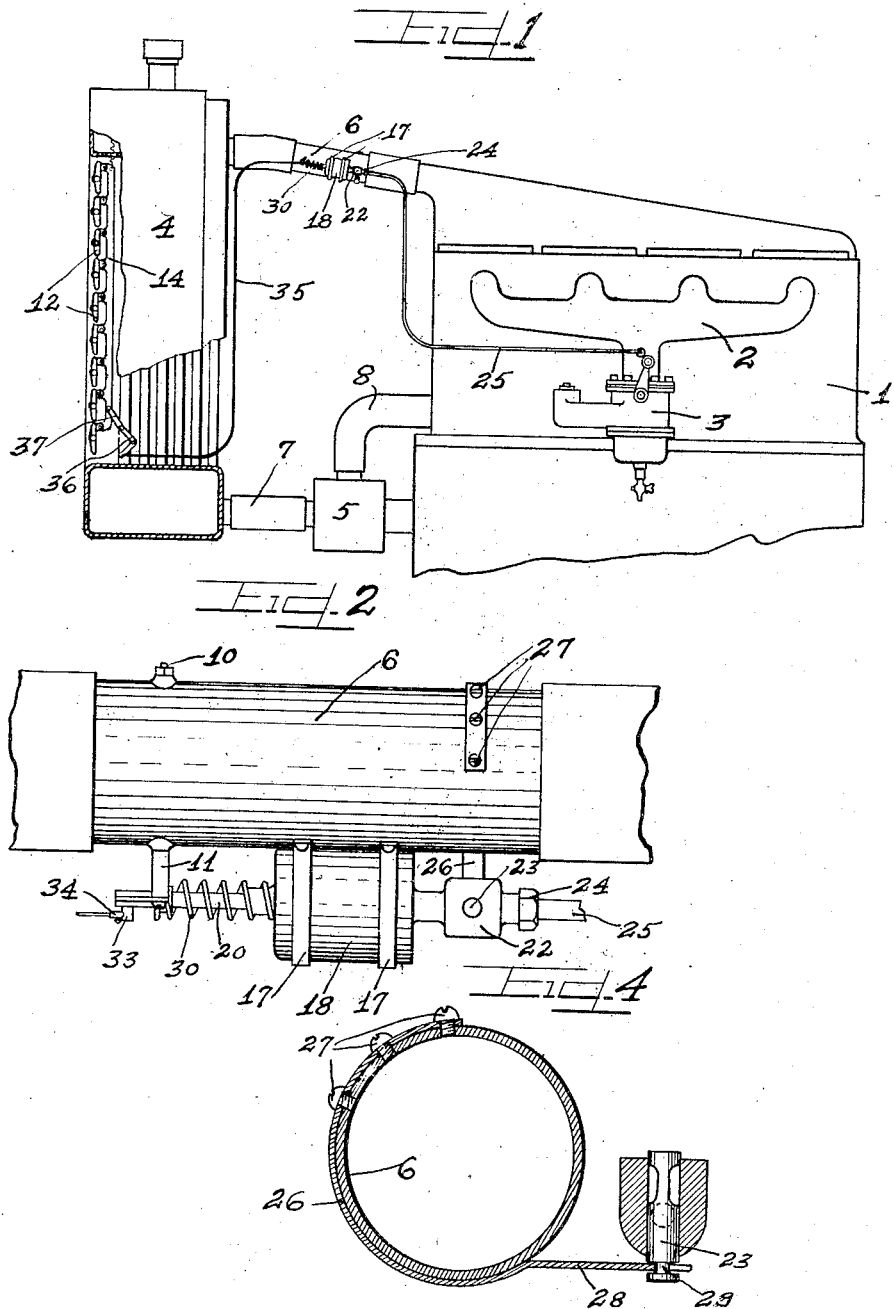

Patented Mar. 12, 1929.

1,704,943

UNITED STATES PATENT OFFICE.

FRANK J. IRVING, OF CHICAGO, ILLINOIS, ASSIGNOR TO PINES WINTERFRONT COMPANY, OF CHICAGO, ILLINOIS, A CORPORATION OF DELAWARE.

THERMOSTATICALLY-CONTROLLED POWER-ACTUATED MEANS.

Application filed December 20, 1920, Serial No. 432,064. Renewed November 18, 1926.

This invention relates to a thermostatically controlled power actuated device and particularly to a device of this kind which is adapted to operate the control and cooling systems of internal combustion engines and to automatically maintain the engines at the proper temperature for efficient operation.

Devices for regulating the flow of cooling water or air have heretofore been quite generally operated directly by a thermostat, and since the power of the thermostat used is necessarily limited, these devices have to be constructed to operate with a minimum of frictional resistance. This necessitates an expensive installation and one which requires frequent adjustment and repair, and because of these disadvantages the use of devices operated directly by thermostats has been limited.

It is an object of the present invention to provide a suction actuated thermostatically controlled device for regulating the temperature of internal combustion engines.

It is also an object of this invention to provide power actuated thermostatically controlled means for regulating the flow of cooling fluid through the cooling systems of internal combustion engines.

It is another object of this invention to provide power actuated thermostatically controlled means for regulating the flow of air through cooling systems.

It is a further object of this invention to provide a device comprising a cylinder containing a piston adapted to be reciprocated therein by means connected in the cylinder and communicating with a source of sub-atmospheric pressure, the passage through said communicating means being thermostatically controlled.

It is an important object of this invention to provide a power operated mechanism adapted to be automatically set in operation at a predetermined temperature and cut out of operation at temperatures below said predetermined temperature.

Other and further important objects of this invention will be apparent from the disclosures in the specification and drawings.

The invention (in a preferred form) is shown on the drawings and hereinafter more fully described.

On the drawings:

Figure 1 is a fragmentary side elevation with parts in section of an installation embodying the principles of this invention.

Figure 2 is a fragmentary top plan view of the piston and controlling thermostat.

Figure 3 is a side elevation of the same.

Figure 4 is a section on the line 4—4 of Figure 3.

Figure 5 is a slightly enlarged section on the line 5—5 of Figure 3.

Figure 6 is a section on the line 6—6 of Figure 3.

Figure 7 is an enlarged fragmentary sectional detail of the radiator shutter mechanism.

Figure 8 is an enlarged fragmentary section detail showing the rear of the radiator shutters in elevation.

As shown on the drawings:

The installation of this invention will for purposes of illustration be shown and described herein in connection with the cooling system of an internal combustion engine and the general arrangement of the installation is shown in Figure 1 where the reference numeral 1 represents an internal combustion engine of the ordinary type having an intake manifold 2 and a carbureter 3 mounted thereon. Fluid for cooling the engine 1 is obtained from a radiator 4 and is circulated through the water jackets of the engine and to said radiator by means of a pump 5 of the usual type, communication between the radiator 4, said pump 5, and the engine 1, being afforded by conduits 6, 7, and 8, which are clearly shown in Figure 1.

Since it is desirable that the engine be brought to an efficient operating temperature as soon after starting as possible, it is necessary that means be provided for restricting the flow of water through the cooling system until the desired temperature is attained and it is also desirable that means be provided whereby the circulation of air through the radiator 4 may be cut off in order that the water or other cooling fluid therein may quickly attain a high enough temperature for the engine to operate efficiently and in order that this temperature may be maintained during cool weather.

For the purpose of controlling the flow of cooling liquid through the circulating system a butterfly valve 9 is mounted in the conduit 6, or if desired at any other position or positions in the liquid circulating system to control the flow of the liquid, on a shaft 10 extending transversely thereof as shown in Figure 6, and the end 11 of said shaft 10 preferably extends outwardly from the conduit 6 in order that said shaft and the butterfly valve may be connected with an operating means in a manner to be described hereinafter.

The circulation of air through the radiator 4 is preferably controlled by means of a plurality of shutters 12 which are pivotally mounted on stub shafts 13 and extend transversely of the front of the radiator 4 and said shutters 12 are adapted to be moved into vertical position to shut off the flow of air through the radiator, or into horizontal position to allow the flow of air through the radiator, by an operating lever 14 which is pivotally connected to a boss 15 on the upper edge of each of said shutters as is clearly shown in Figures 7 and 8. Said shutters 12 are normally held in vertical or closed position by means of a coil spring 16 connected between the upper end of the operating lever 14 and the frame of the radiator 4 and an automatic power actuated device for moving said shutters into horizontal or open position upon the water in the radiator reaching a predetermined temperature will now be described.

Secured to the outside of the conduit 6 by means of brackets 17 is a closed cylinder 18 having a piston or plunger 19 slidably mounted therein with a piston rod or shaft 20 secured thereto and slidably mounted in and extending outwardly through a central apertured boss 21 formed on the end of the cylinder. Connected in the other end of the cylinder 18 is a passaged block 22 having a balanced sliding valve 23 mounted therein and connected with the passage in said block by a connection 24 is a conduit 25 which leads to the intake manifold 2 of the engine, thereby connecting the interior of the cylinder 18 with a region of sub-atmospheric pressure when the sliding balanced valve 23 is opened.

Means are provided for opening said sliding balanced valve 23 to connect the interior of the cylinder 18 with the intake manifold 2 of the engine when the liquid passing through the conduit 6 has arrived at a predetermined temperature. For this purpose a strip of thermostatic metal 26 formed to conform to the exterior of the conduit 6 is secured to said conduit by means of screws 27 and has an outwardly extending slotted portion 28 thereof engaged over a reduced portion 29 on the outer end of the valve 23. Consequently, a rise in temperature of the liquid in the conduit 6 will be transmitted through said conduit to the thermostatic strip 26 thereby causing an expansion of said strip and opening the valve 23 to allow communication through the conduit 25 between the interior of the cylinder 18 and the intake manifold 2 of the engine. The vacuum thus formed in the interior of the cylinder 18 causes the piston 19 therein to move toward the inner end of the cylinder compressing a coiled spring 30 which is engaged around a piston rod 20 between the end of the cylinder and a flanged washer 31 pinned on said piston rod, this inward motion of the piston being clearly indicated in dotted lines in Figure 5.

The movemet of the piston 19 in the cylinder 18 is transmitted through the piston rod to the butterfly valve 9 and the operating lever 14 for the shutters 12 in a manner which will now be described. Secured to the outer end of the extension 11 on the shaft 10 is a slotted crank arm 32 the outer end of which is engaged over a pin 33 extending through a slot in the outer end of the piston rod 20. A suitable connection 34 is formed on said pin 33 and a Bowden wire 35 secured in said connection leads to a bell-crank lever 36 which is pivoted on the radiator as shown in Figure 7 and which actuates the operating lever 14 to open the shutter against the action of the spring 16 through a pivotally connected toggle or link connection 37.

The operation is as follows:

When the engine 1 is first started and the water in the circulating system is cooled the shutters 12 and the butterfly valve 9 are held in closed position by the springs 16 and 30 and the balanced valve 23 is held closed by the thermostat 26 thereby shutting off communication between the manifold 2 and the interior of the cylinder 18. Thus the circulation of cooling liquid and cooling air is prevented and the engine quickly attains an efficient operating temperature. The cooling liquid in the circulating system of course also attains this temperature and the heat from the liquid is transmitted to the conduit 6, whereby the thermosatic strip 26 expands, and since said thermostat is connected by means of the extension 28 with the balanced valve 23 said valve 23 is opened by the expansion of the thermostat. The opening of the valve 23 of course acts to connect the interior of the cylinder 18 with the intake manifold 2 of the engine and since the pressure in said intake manifold is less than atmospheric a vacuum is created in said cylinder 18 on one side of the piston 19 thereby causing the piston to be moved to the inner end of the cylinder. This movement of the piston 19 is transmitted through the crank arm 32 to move the butterfly valve 9 into open position thereby allowing an unrestricted circulation of cooling liquid, and through the Bowden wire 35 to the shutter operating mechanism to open the shutters 12 thereby allowing a free circulation of cooling air through the radiator 4. The suction produced in the manifold 2 of course acts to hold the piston 19 and the valve 9 and shutters 12 in the position just described until the conduit 6 again cools sufficiently to allow the thermostat 26 to contract and close the valve 23 thereby cutting off the suction on the piston and allowing the valve 9 and the shutters 12 to be again closed by the action of the springs 30 and 16.

It is thus apparent that this invention provides an efficient and economical power actuated device for automatically regulating the temperature of the engine by controlling the flow of various cooling mediums. Due to the fact that the device is power operated the necessity for exact construction and careful lubrication which is present in devices operated directly by thermostats is obviated. On account of this construction it is also possible to use a light and inexpensive thermostat which is easy to install and which may be readily maintained in proper adjustment.

While the installation of this invention has been shown and described in connection with an automatic temperature controlling system for internal combustion engines, it is also apparent that the installation might be conveniently used for the automatic operation of many other devices, and it is not purposed to limit the invention to use in connection with cooling systems.

I am aware that numerous details of construction may be varied through a wide range without departing from the principles of this invention, and I therefore do not purpose limiting the patent granted otherwise than necessitated by the prior art.

I claim as my invention:

1. In a temperature controlling apparatus for internal combustion engines, a radiator, shutter means for controlling flow of air about said radiator and engine, valve means for controlling the flow of fluid within said radiator, means responsive to the running condition of the engine to actuate said valve means and said shutter means and thermal means responsive to engine temperature for controlling said shutter and valve means.

2. In a temperature controlling apparatus for internal combustion engines, a radiator, shutter means for controlling the flow of air about said radiator and engine, suction means responsive to the running condition of the engine for actuating said shutter means, valve means for controlling flow of fluid within said radiator and thermal means responsive to engine temperature for controlling said valve means and suction means.

3. In a temperature controlling apparatus for internal combustion engines, a radiator, a plurality of shutters for regulating the flow of air about said radiator and engine, valve means for regulating flow of cooling liquid within said radiator, resilient means for biasing said shutters and valve means to closed position and thermal means responsive to engine temperature for controlling said shutter means and said valve means.

4. In a temperature controlling apparatus for internal combustion engines, a radiator, a plurality of shutters for regulating the flow of air about said radiator and engine, valve means for regulating flow of cooling liquid within said radiator, suction means responsive to the running condition of the engine to actuate said shutters and valve to open position and thermal means to place said valve and shutters under control of said suction means.

5. In a temperature controlling apparatus for internal combustion engines, a radiator, a plurality of shutters for regulating the flow of air about said radiator and engine, valve means for regulating flow of cooling liquid within said radiator, suction means responsive to the running condition of the engine to actuate said shutters to open position, operative mechanical connections between said suction means and said valve means and thermal means responsive to engine temperature to control said suction means.

6. In a temperature controlling apparatus for internal combustion engines, a radiator, a plurality of shutters for controlling flow of air therethrough, a chamber having a movable wall responsive to engine suction, operative mechanical connections between said movable wall, said shutters and said valve means, second valve means controlling the application of engine suction to said chamber and thermal means responsive to engine temperature to control said second valve means.

7. In a temperature controlling apparatus for internal combustion engines, a radiator, a plurality of shutters for controlling the flow of air therethrough, balanced valve means for controlling the flow of fluid within said radiator, means for closing said shutters and for closing said valve means to shut off access of cooling mediums to said engine when said engine is still, suction means tending to open said valve and shutters when said engine is in running condition, and thermal means responsive to predetermined engine temperature to actuate said suction means to open said valve and shutters.

In testimony whereof I have hereunto subscribed my name.

FRANK J. IRVING.